(12) United States Patent  
Garcia

(10) Patent No.: US 8,112,332 B1
(45) Date of Patent: Feb. 7, 2012

(54) FINANCIAL ASSESSMENT SYSTEMS AND METHODS

(75) Inventor: Rennie Garcia, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 24 days.

(21) Appl. No.: 11/323,472

(22) Filed: Dec. 30, 2005

(51) Int. Cl.
*G06Q 40/00* (2006.01)

(52) U.S. Cl. .......................... 705/35; 705/36 R
(58) Field of Classification Search .................... 705/35, 705/36 R
See application file for complete search history.

(56) References Cited

U.S. PATENT DOCUMENTS

| | | | |
|---|---|---|---|
| 5,819,263 A | 10/1998 | Bromley et al. | |
| 5,956,691 A | 9/1999 | Powers | |
| 6,012,043 A | 1/2000 | Albright et al. | |
| 6,064,984 A | 5/2000 | Ferguson et al. | |
| 6,253,192 B1 | 6/2001 | Corlett et al. | |
| 6,430,542 B1 | 8/2002 | Moran | |
| 6,684,190 B1 | 1/2004 | Powers et al. | |
| 7,516,084 B1 * | 4/2009 | Sankaran et al. | 705/10 |
| 7,657,471 B1 * | 2/2010 | Sankaran et al. | 705/35 |
| 2002/0007332 A1 | 1/2002 | Johnson et al. | |
| 2002/0019791 A1 * | 2/2002 | Goss et al. | 705/36 |
| 2002/0073005 A1 | 6/2002 | Welnicki et al. | |
| 2002/0091607 A1 * | 7/2002 | Sloan et al. | 705/36 |
| 2002/0143680 A1 * | 10/2002 | Walters et al. | 705/36 |
| 2002/0147671 A1 | 10/2002 | Sloan et al. | |
| 2003/0069869 A1 * | 4/2003 | Gronau et al. | 706/46 |
| 2004/0054610 A1 * | 3/2004 | Amstutz et al. | 705/36 |
| 2005/0027577 A1 * | 2/2005 | Saeed | 705/8 |
| 2006/0010060 A1 * | 1/2006 | Jones et al. | 705/35 |
| 2006/0015423 A1 * | 1/2006 | Ballenger | 705/35 |
| 2006/0074788 A1 | 4/2006 | Grizack et al. | |

OTHER PUBLICATIONS

"Financial Planning Fundamentals: More Than Just saving and Investing", http://www.life-line.org/pop_pyramid.html, (Last Viewed: Dec. 17, 2005),2 p.
"U.S. Appl. No. 11/324,150, Non-Final Office Action mailed Aug. 10, 2007", 6 p.

* cited by examiner

*Primary Examiner* — Lalita Hamilton
(74) *Attorney, Agent, or Firm* — Kilpatrick Townsend & Stockton LLP

(57) ABSTRACT

Financial assessment systems, methods and graphical user interfaces are described. Financial information for an individual is received and integrated in a financial plan. A synopsis view of the financial plan is graphically presented. The synopsis view of the financial plan may include one or more financial recommendations for the individual. The recommendations and the synopsis view may be updated in real-time in response to a change in the financial information. The recommendations and the synopsis view may be used by the individual who is the subject of the financial plan or may be used by financial advisors. Other embodiments may be described and claimed.

22 Claims, 8 Drawing Sheets

FINANCIAL ASSESSMENT SYSTEMS AND METHODS

CROSS REFERENCES

This application is related to U.S. application Ser. No. 11/324,150 titled "Financial Assessment Systems and Methods"; filed on Dec. 30, 2005. This application is also related to U.S. application Ser. No. 11/323,311 titled "Financial Assessment Systems and Methods" filed on Dec. 30, 2005.

TECHNICAL FIELD

Various embodiments described herein relate to computer systems and user interfaces generally, including systems and methods for providing a financial assessment.

BACKGROUND

Financial product providers are not currently able to accurately track their customers' financial well-being to ensure that they are helping the customer. Currently, customers contact a financial product provider when the customer thinks that he/she needs a product or service. In response to the customer-initiated contact, the financial product provider offers recommendations. Thus, financial product providers work in a manner that is reactive to their customers' needs.

SUMMARY

Financial assessment systems, methods, and graphical user interfaces are described. Financial information for an individual is received and integrated in a financial plan. A synopsis view of the financial plan is graphically presented. The synopsis view of the financial plan may include one or more financial recommendations for an individual. The recommendations and the synopsis view may be updated in real-time in response to a change in the financial information. The recommendations and the synopsis view may be used by an individual who is the subject of the financial plan, or may be used by financial advisors.

DETAILED DESCRIPTION

The following detailed description is divided into four sections. The first section presents a system level overview of the inventive subject matter. The second section provides methods of using example embodiments of the inventive subject matter. The third section describes example implementations. The fourth section describes the hardware and the operating environment in conjunction with which embodiments can be practiced.

System Level Overview

Figure 1:
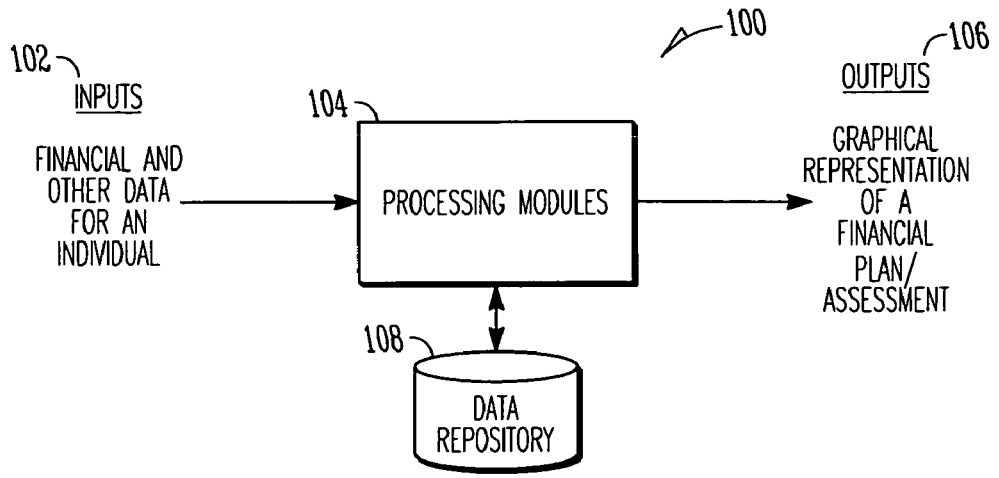
FIG. 1 comprises a block diagram of a financial assessment system according to various embodiments.

FIG. 1 comprises a block diagram of a financial assessment system 100 according to various embodiments. The system 100 comprises inputs 102, processing modules 104, outputs 106, and one or more data repositories 108.

The inputs 102 include financial, and other data, for an individual. The financial, and other data, may be received from an individual who is the subject of the financial plan. The financial, and other data, may also be received from a financial advisor (also referred to as a "member service representative"), or from existing information about an individual maintained by the financial institution.

The processing modules 104 integrate the financial, and other data, to create a financial plan or financial assessment. The financial plan or financial assessment is updated automatically when the inputs 102 change. The processing modules 104 generally include routines, programs, objects, components, data structures, etc., that perform particular functions or implement particular abstract data types. The processing modules described herein may be used for all forms of financial planning. The processing modules may be incorporated in any financial planning software including, but not limited to, financial planning application programs for use by a financial advisor, a financial product provider, or an individual who is the subject of the financial plan. The processing modules 104 create a graphical representation of the financial plan or financial assessment in response to the inputs 102. The processing modules 104 are described in more detail by reference to FIG. 2.

The outputs 106 include a graphical representation of a financial plan or financial assessment. The graphical representation provides a single view summary of an individual's financial condition. The single view is also referred to as a synopsis view. In one embodiment, the graphical representation is displayed by customer-relations management ("CRM") software used by a financial institution. In another embodiment, the graphical representation is displayed as a financial dashboard view presented online using a web browser. In still another embodiment, the graphical representation is printed on a financial statement or other printed materials. In still another embodiment, the graphical representation may be provided to the member electronically such as by e-mail.

The data repositories 108 comprise one or more data storage devices. In one embodiment, the data storage devices may contain data that is used by a financial institution. When the data in the data repository 108 includes financial or other data for an individual, the data may be one of the inputs 102 for the system 100.

Embodiments of the financial assessment system 100 provide an individual with a representation of an individual's overall financial situation.

Figure 2:
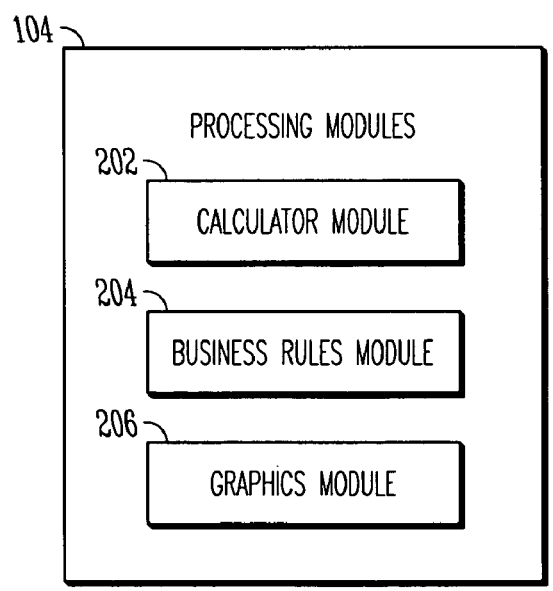
FIG. 2 is a block diagram of the processing modules of the system shown in FIG. 1 according to various embodiments.

FIG. 2 is a block diagram of the processing modules 104 of the system shown in FIG. 1 according to various embodiments. The processing modules 104 comprise: a calculator module 202 to perform numeric calculations on financial planning data for an individual; a business rules module 204 to apply business rules to the financial planning data; and a graphics module 206 to receive dynamic content from the calculator module 202 and the business rules module 204, and to utilize the dynamic content to generate a graphical representation of a financial condition of an individual as a single view.

The calculator module 202 performs numeric calculations on financial planning data for an individual. In one embodiment, the calculator module 202 provides software tools to manage financial affairs such as a special purpose calculator program ("a calculator"). Examples of calculator programs include, but are not limited to, retirement planning calculators, insurance calculators, mortgage calculators, college savings calculators, budget calculators, and any other financial related calculator or tool. The calculators perform numeric calculations on financial planning data for an individual. The financial, and other data, used for the numeric calculations may be input directly by an individual, or may be pre-filled in the calculator from data that is stored in the data repository 108 (shown in FIG. 1). In addition to providing immediate information to an individual (e.g., how much an individual's monthly mortgage payment will be reduced by refinancing), the calculators provide financial, and other data, to the business rules module 204, and/or the graphics module 206 of the processing modules 104. The financial, and other data, provided by the calculator module 202 is dynamic content. The content is dynamic because the content depends on the information that is input from an individual, or associated with that individual in the data repository 108. The dynamic content is provided to the graphics module 206.

The business rules module 204 applies business rules to the financial, and other data, of an individual. In some embodiments, the business rules are based on industry or practice standards for financial planning (e.g., an individual should maintain an emergency fund with enough money to cover 3-6 months of basic living expenses.) However, the business rules are not limited to rules based on industry or practice standards, and may be any guidelines, suggestions, ratios, or recommendations for an individual's financial situation. In addition to the dynamic nature of an individual's financial data provided by calculator module 202, the business rules may also be dynamic. A financial institution may change or update the rules applied by the business rules module 206. Also, changes in an individual's financial data may trigger the application of business rules that did not previously apply. The application of the business rules to an individual's financial, and other data, provides additional dynamic content that is provided to the graphics module 206.

The graphics module 206 receives dynamic content from the calculator module and the business rules module and utilizes the dynamic content to generate a graphical representation of a financial condition of an individual as a single view. The single view provides a synopsis of a financial plan or assessment. The graphical representation integrates information from multiple sources into a single unified display. In one embodiment, the graphical representation integrates information from the calculators, the business rules, and the data repositories in real-time. Thus, as an individual's financial or other data is updated, the graphics module 206 is updated.

The graphical representation also shows one or more recommendations for an individual's financial situation. The recommendations are indicated graphically within the synopsis view by changing the appearance of an item, by changing the position of an item, or by animating an item. A more detailed description of ways to provide recommendations within the synopsis view is provided in the Example Implementations section of this Detailed Description.

The graphics module 206 updates the graphical representation of the financial plan in response to changes in an individual's financial data and/or in the business rules. As a result, the system shown in FIG. 1 and FIG. 2 transforms an individual's financial, and other data, into a real-time financial plan or assessment.

The financial assessment system shown in FIG. 1 and FIG. 2 is not limited to calculator programs, business rules and information stored in the data repository as sources for the dynamic content. In alternate embodiments, an individual provides financial, and other data, by completing an electronic questionnaire. In still other embodiments, a financial advisor, or member service representative, may ask an individual one or more questions and provide the information to processing modules 104, or save the information in the data repository 108. In some cases, an individual may have accounts with different financial product providers. The individual may provide the financial information for accounts held by these different financial institutions. This provides a useful result because the financial assessment system may create a summary of an individual's overall financial situation, not just a summary of the financial information related to the accounts held by a particular financial institution.

Methods

In this section, particular methods of example embodiments are described by reference to a series of flow charts. The methods to be performed constitute computer programs made up of computer-executable instructions.

Figure 3:
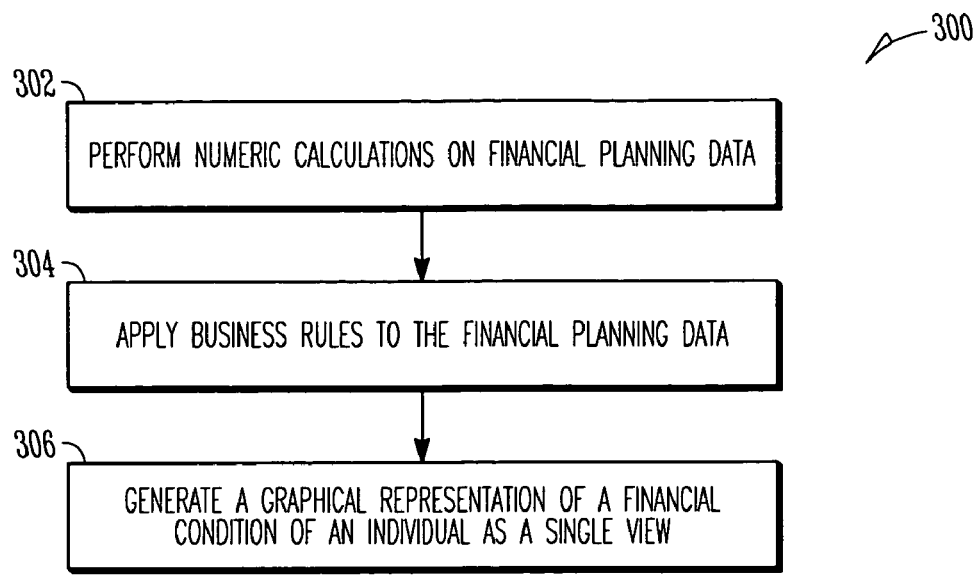
FIG. 3 is a flow diagram illustrating a method of generating a real-time financial plan according to various embodiments.

FIG. 3 is a flow diagram illustrating a method 300 of generating a real-time financial plan according to various embodiments. As shown in FIG. 3, numeric calculations are performed on financial planning data for an individual 302 and business rules are applied to the financial planning data 304. Then, a graphical representation of a financial condition of an individual is generated as a single view 306.

According to the method shown in FIG. 3, the financial planning data may be provided by a financial advisor (or member service representative), by an individual who is the subject of the financial plan, and/or from a financial institution's data repositories.

The graphical representation of an individual's financial condition may be displayed by a customer relations management software tool, displayed by a web browser (such as with a financial dashboard), printed on a financial statement or other printed material, or sent electronically by e-mail.

Figure 4:
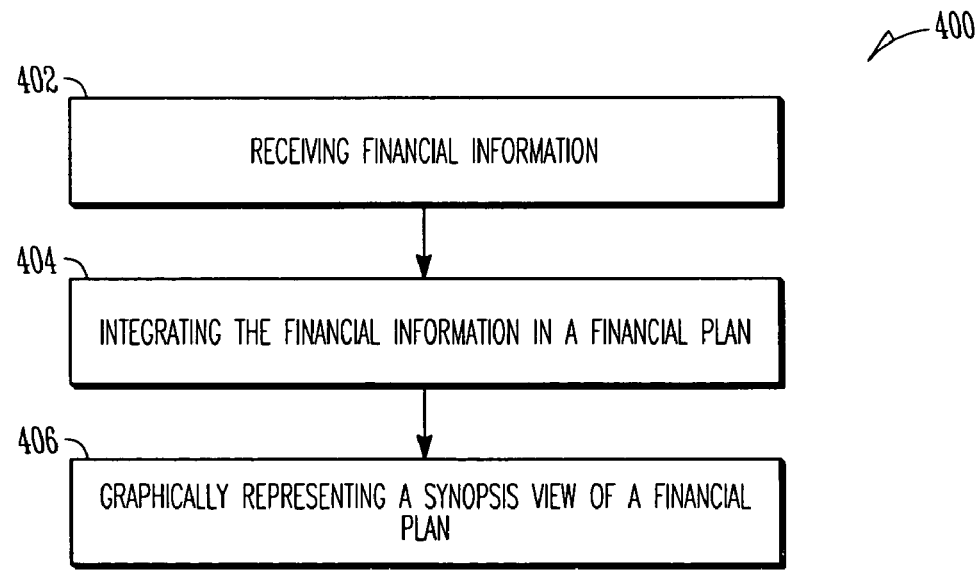
FIG. 4 is a flow diagram illustrating an alternate method of generating a financial plan according to various embodiments.

FIG. 4 is a flow diagram illustrating an alternate method of generating a financial plan according to various embodiments. As shown in FIG. 4, the method begins by receiving financial information from two or more computerized systems 402. The computerized systems may be different systems within a financial institution, or may be systems within different companies. As shown in FIG. 4, the financial information is integrated in a financial plan 404 and a synopsis view of the financial plan is graphically presented 406.

In alternate embodiments, the synopsis view of the financial plan 406 may be automatically updated. The synopsis view 406 may provide access to more detailed information, financial tools, financial product information, one or more online applications for financial products, or a history of one or more recommendations provided to an individual by a financial advisor.

In still another embodiment, the information shown in the synopsis view 406 is customizable by an individual or a financial advisor. The individual or financial advisor may customize what information is displayed or how the information is displayed, how much information is displayed in the synopsis view 406.

Figure 5:
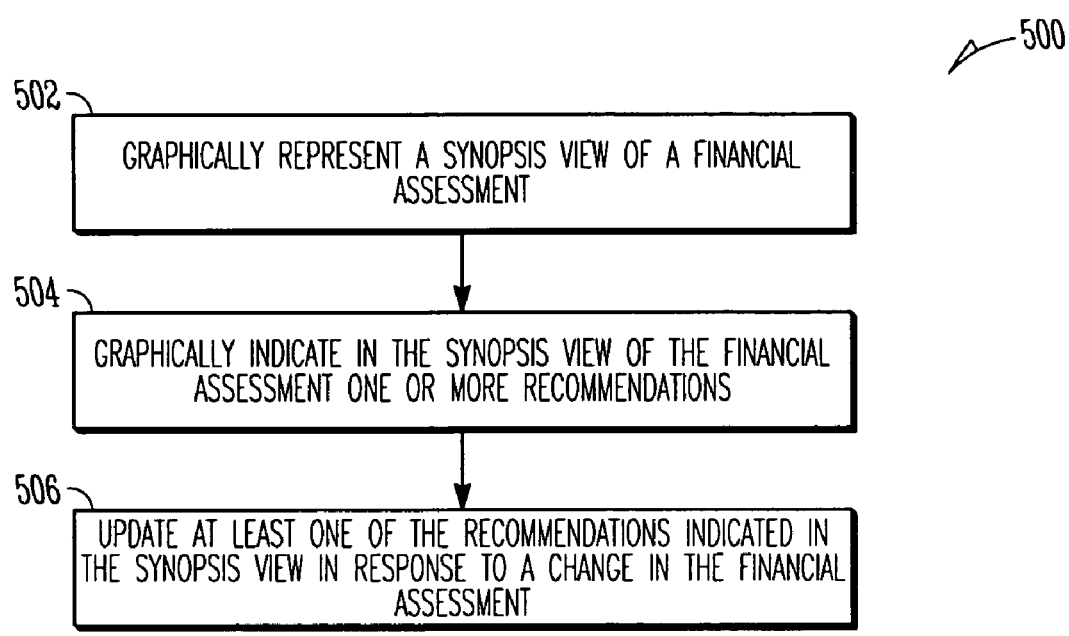
FIG. 5 is a flow diagram illustrating a method of facilitating financial counseling according to various embodiments.

FIG. 5 is a flow diagram illustrating a method of facilitating financial counseling according to various embodiments. As shown in FIG. 5, a synopsis view of a financial assessment of an individual is graphically presented 502. In addition, one or more recommendations for an individual are graphically indicating in the synopsis view of the financial assessment 504. Then, at least one of the recommendations indicated in the synopsis view is updated in response to a change in the financial assessment. The recommendations are indicated graphically within the synopsis view by changing the appearance of an item, by changing the position of an item, or by animating an item. The recommendations may be updated after a life event, after a predefined period of time, or upon a change in data used for the financial assessment of an individual.

Example Implementations

Various examples of systems and methods for embodiments of the invention have been described above. In this section FIGS. 6A, 6B, 6C, 7, and 8 illustrate examples of graphical user interfaces incorporating visual indicators with a synopsis view to indicate financial recommendations according to various embodiments. The examples shown in FIGS. 6A, 6B, 6C and 7 are based on a financial planning pyramid. A financial planning pyramid is one example of a graphical representation used to illustrate an individual's financial planning objectives. The graphical representation is not limited to pyramid shape however. The graphical representation may have any shape or format that visually presents components or elements of a financial plan. For example, the graphical representation shown in FIG. 8 is based a rectangle that is divided into tiers.

Figure 6A:
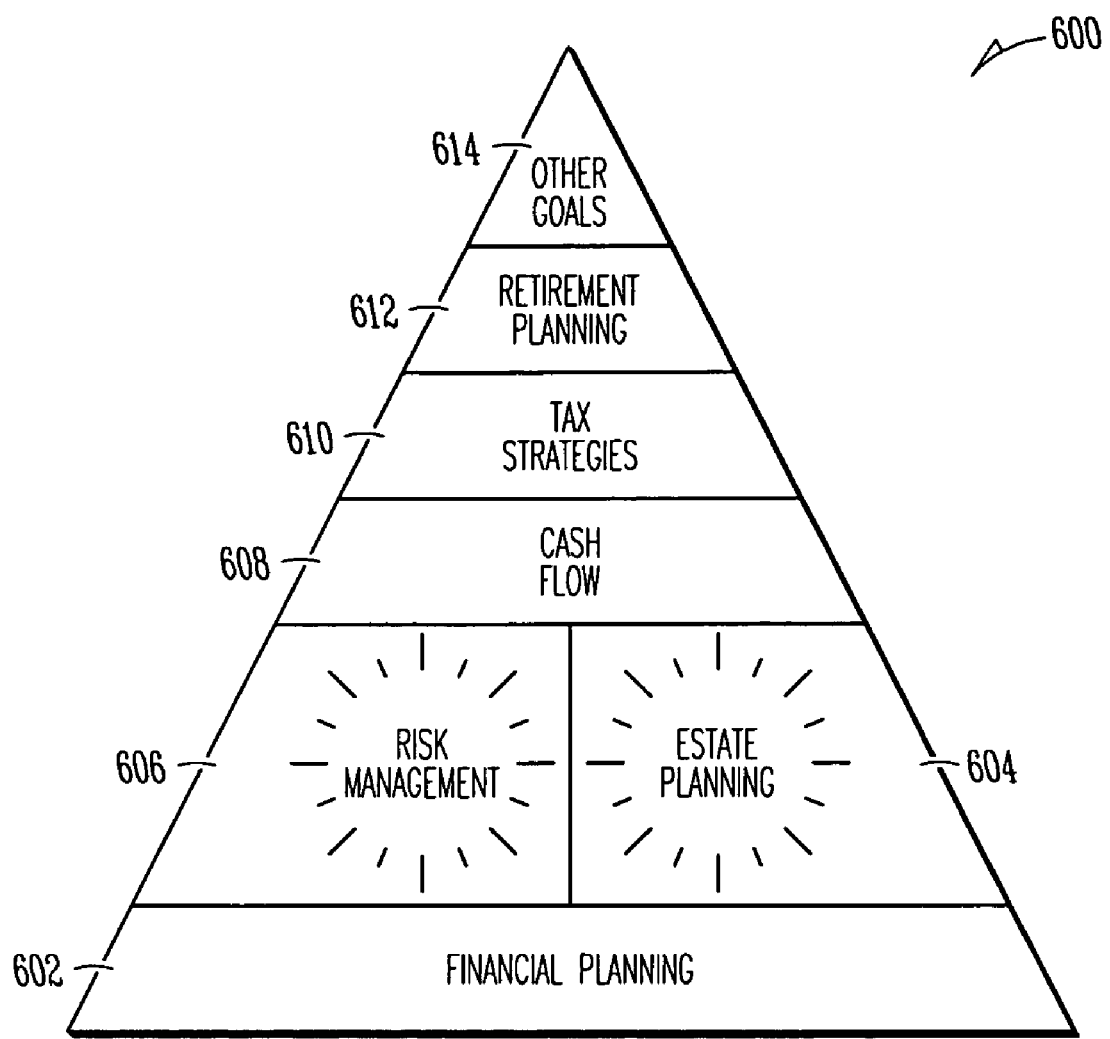
FIGS. 6A, 6B, 6C, 7, and 8 illustrate examples of graphical user interfaces incorporating visual indicators with a synopsis view to indicate financial recommendations according to various embodiments.
Figure 6B:
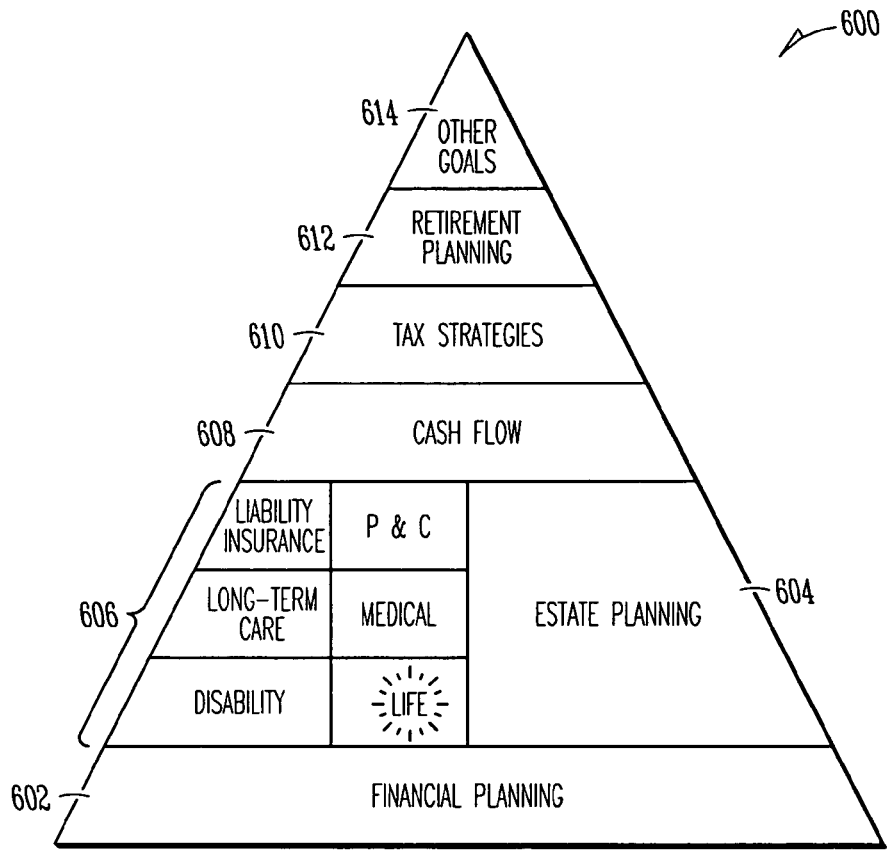
Figure 6C:
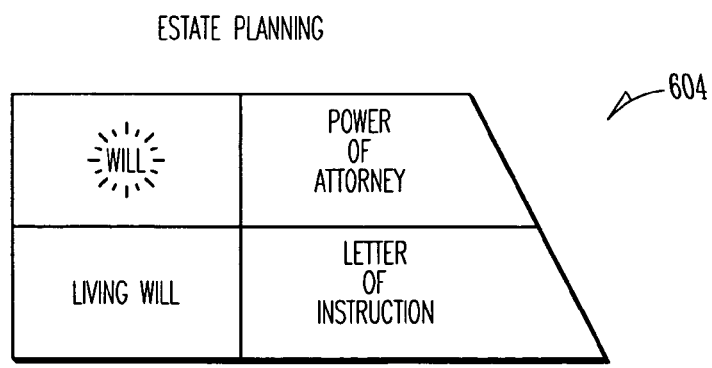

In the example shown in FIGS. 6A, 6B, and 6C, the recommendations are indicated by animating components of the graphical user interface. Animation may include, but is not limited to, moving, bouncing, blinking, or pulsing components within the graphical user interface 600.

FIG. 6A is a diagram of a graphical user interface 600 according to an example embodiment. In the example shown in FIG. 6A, the graphical user interface 600 is divided into sections representing different components of a financial plan. In the example graphical user interface 600 shown in FIG. 6A, there are seven components. The sections comprise a financial planning component 602, an estate-planning component 604, a risk management component 606, a cash flow component 608, a tax strategies component 610, a retirement planning component 612, and an other goals component 614. In the example shown in FIG. 6A, recommendations are indicated for the risk management component 606 and the estate planning component 604. The recommendations are visually indicated by causing each one of the components 604 and 606 to blink.

FIGS. 6B and 6C are examples of additional information that may be accessed through the synopsis view shown in FIG. 6A. In the example shown in FIG. 6B, a financial advisor or an individual selects the risk management component 606 and a list of subcategories within the risk management category is displayed. The subcategories within the risk management component 606 include, but are not limited to, liability insurance, property and casualty insurance ("P&C"), long-term care insurance, medical insurance, disability insurance, and life insurance. The list of subcategories visually indicates that individual's life insurance needs are not met by causing the life component to blink. Although not shown in FIG. 6B, the graphical representation may provide additional levels of detail. For example, if the individual selects the life insurance component, a detailed explanation of why the individual's needs are not met may be provided (e.g., the individual's term life insurance policy just expired and the individual does not have any other life insurance policies.) The graphical representation may also provide access to more detailed information about new life insurance policies and, in some embodiments, may provide on-line applications for new life insurance policies.

In the example shown in FIG. 6C, a financial advisor or an individual selected the estate planning component 604 of the graphical representation shown in FIG. 6A. In response, an expanded view of the estate-planning component 604 is displayed separate from the graphical representation 600. The financial advisor or individual can quickly see that the will component is blinking to indicate that a will needs to be created or updated. In the example shown in FIG. 6C, the information displayed may vary depending on whether the individual or the financial advisor is selecting the will component. For example, the individual receives instructions for preparing a will while the financial advisor receives a script for explaining to a customer why wills are important.

Figure 7:
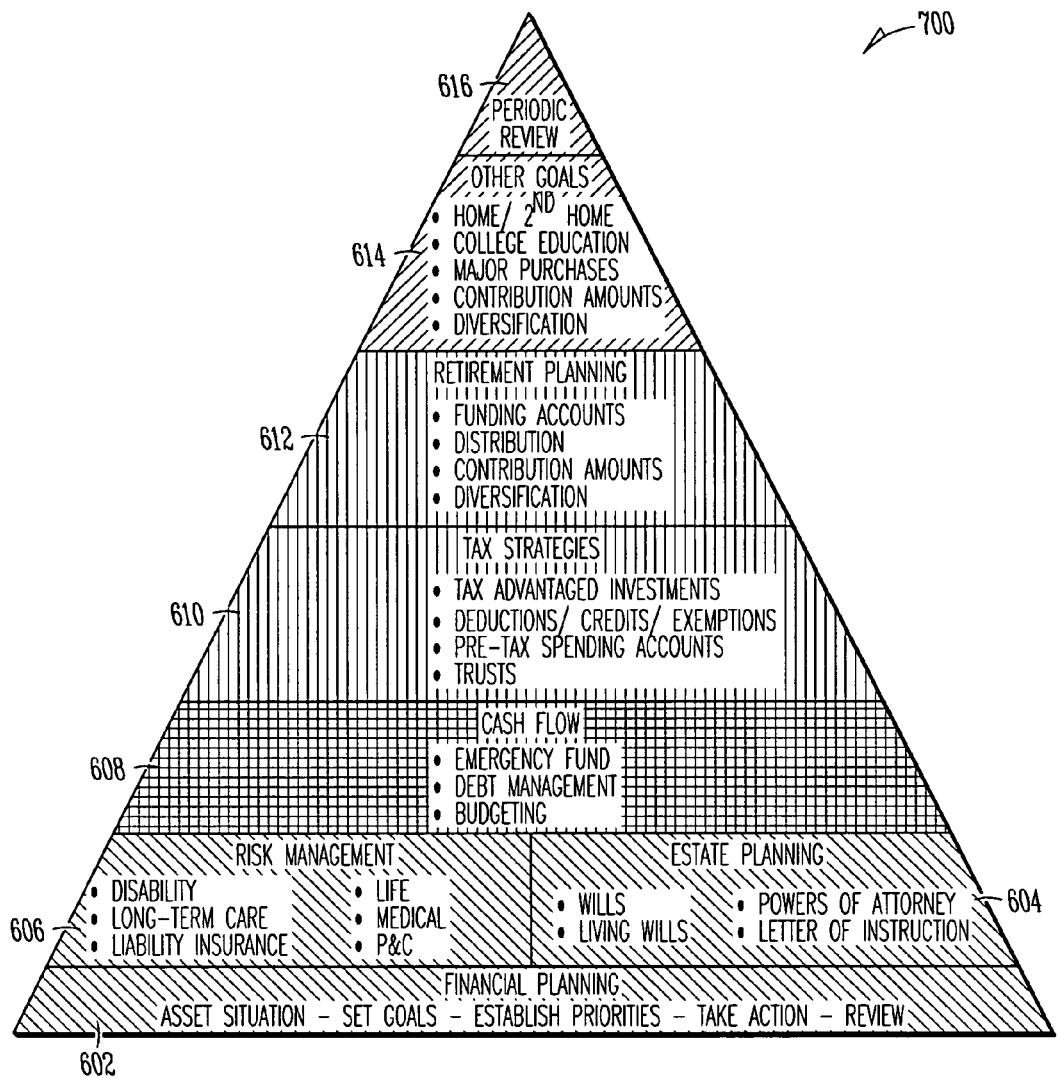
Figure 8:
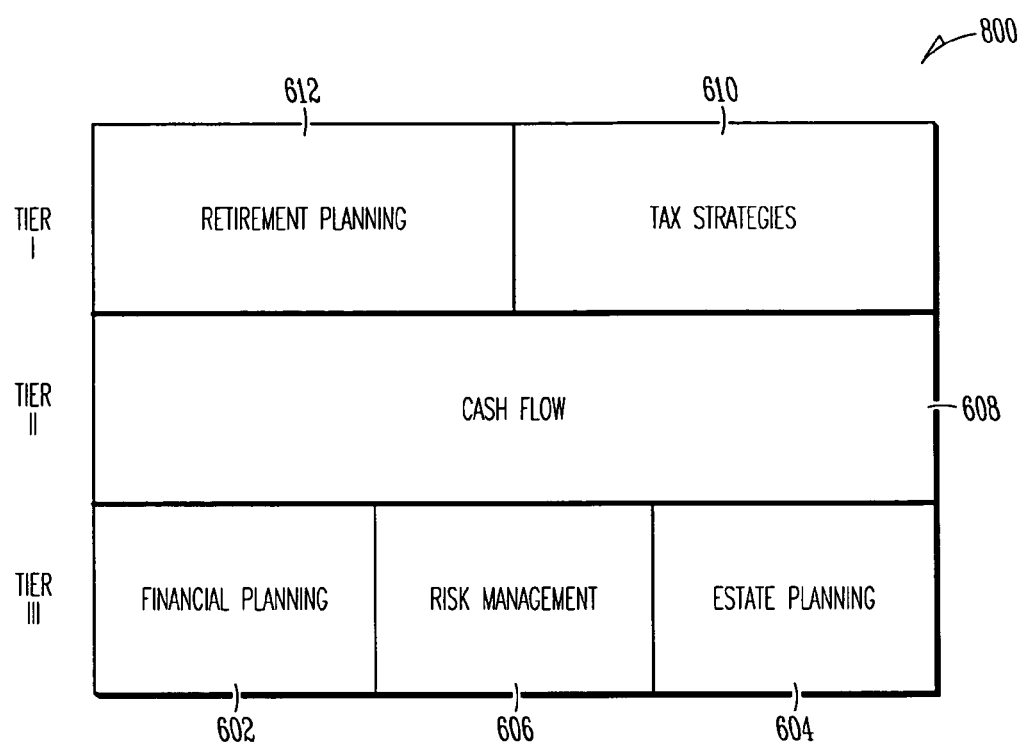

FIG. 7 is a diagram of a graphical user interface 700 according to an example embodiment. In the example shown in FIG. 7, the recommendations are indicated by changing the appearance of components of the graphical user interface. Changes to the appearance of a component may include, but are not limited to, changing the size, color, shading, brightness, and border of the component within the graphical user interface 700. The graphical user interface 700 is similar to the graphical user interface 600 shown in FIG. 6; however, the graphical user interface 700 provides more detail for each one of the components in the synopsis view. The sections shown in FIG. 7 comprise a financial planning component 602, an estate-planning component 604, a risk management component 606, a cash flow component 608, a tax strategies component 610, a retirement planning component 612, an other goals component 614, and a periodic review component 616. In the example shown in FIG. 7, recommendations are visually indicated by changing the color of one or more of the components of the graphical user interface. For example, a financial institution may use a first color (e.g., green) to indicate that an individual's financial condition complies with the financial plan. The financial institution may use a second color (e.g., yellow) to indicate that an individual's financial condition is partially in compliance with the financial plan. The financial institution may use a third color (e.g., red) to indicate that an individual's financial condition is not in compliance with the financial plan.

These representative colors are illustrated in FIG. 7 using different cross-hatching patterns. The financial planning component 602, the estate planning component 604, and the risk management component 606 are color coded with the first color (e.g., green) to indicate the individual is adequately protected in these areas and that no action is needed.

The cash flow component 608 is color coded with the second color (e.g., yellow) to indicate that further action is recommended in this area because the individual has only partially addressed the needs in this area.

The tax strategies component 610 and the retirement planning component 612 are color coded with the third color (e.g., red) to indicate that action is recommended in this areas. Action may be recommended for various reasons including because the individual has not taken any steps to implement a particular area of the financial plan or that the individual's financial condition has changed and as a result, these components are no longer adequately addressed. For example, the tax strategies component 610 may be color coded with red because the individual has not taken advantage of available benefits such as pre-tax spending accounts. In another example, the retirement planning component 612 may be color coded with red because the individual has not set up any retirement accounts or retirement savings plans. In some embodiments, the color-coding also implies a level of importance. For example, items color-coded with red may be more critical to address than items color-coded in yellow. Likewise, items color-coded in yellow may be more important to address than items color-coded in green.

As described above, the graphical representation of an individual's financial condition may be updated based on information received from the individual, a financial advisor, or from a financial institution's data repositories. In some instances, the financial assessment system described by reference to FIG. 2 may not have complete information for all of the components of the financial plan. In one embodiment, the graphical representation visually indicates if the financial data and other data that applies to a particular component of the financial plan is not complete. In the example shown in FIG. 7, the data for the other goals component 614 is not complete and as a result, the other goals component 614 is coded with still a different color in the graphical representation. The visual appearance of components having incomplete information reminds the individual or the financial advisor that this information is needed and may prompt them to provide the data at the next opportunity.

FIG. 8 is a diagram of a graphical user interface 800 according to an example embodiment. In the example shown in FIG. 8, the recommendations are indicated by changing the position of components within the graphical user interface. Although, the graphical user interface 800 provides recommendations similar to the graphical user interface 700 shown in FIG. 7, the graphical user interface 800 does not use the same pyramid shape for the graphical representation. The graphical representation shown in FIG. 8 is a rectangle with tiers. The importance of recommendations is indicated by which tier in the rectangle a component is positioned. In the example shown in FIG. 8, recommendations are visually indicated by changing the position of components of financial plan from one tier to a different tier within the graphical user interface.

In the example shown in FIG. 8, the financial planning component 602, the estate planning component 604, and the risk management component 606 are positioned in the bottom tier ("Tier III") to indicate the individual is adequately protected in these areas or that these components are a lower priority for the individual than the middle tier ("Tier II") and the top tier ("Tier I") components.

The cash flow component 608 is positioned in the middle tier to indicate that further action is recommended in this area because the individual has only partially addressed the needs in this area. The tax strategies component 610 and the retirement planning component 612 are positioned in the upper tier to indicate that immediate action is recommended in this areas.

The inventive subject matter is not limited to the example graphical user interfaces shown in FIGS. 6a, 6b, 6c, 7 and 8. These examples are provided for illustrative purposes only. Any graphical user interface may be used that provides automated recommendations for financial products and services. The graphical user interface is useful because it serves as a reminder to the individual who is the subject of the financial plan that certain areas of their financial plan need additional action. The graphical user interface is also useful because it allows financial product providers to serve their customers in a manner that is proactive. Financial product providers may advise customers of unmet needs based on information provided by the graphical user interface.

Hardware and Operating Environment

This section provides an overview of example hardware and operating environments, in conjunction with which embodiments of the inventive subject matter can be implemented.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed below regarding FIG. 9.

Figure 9:
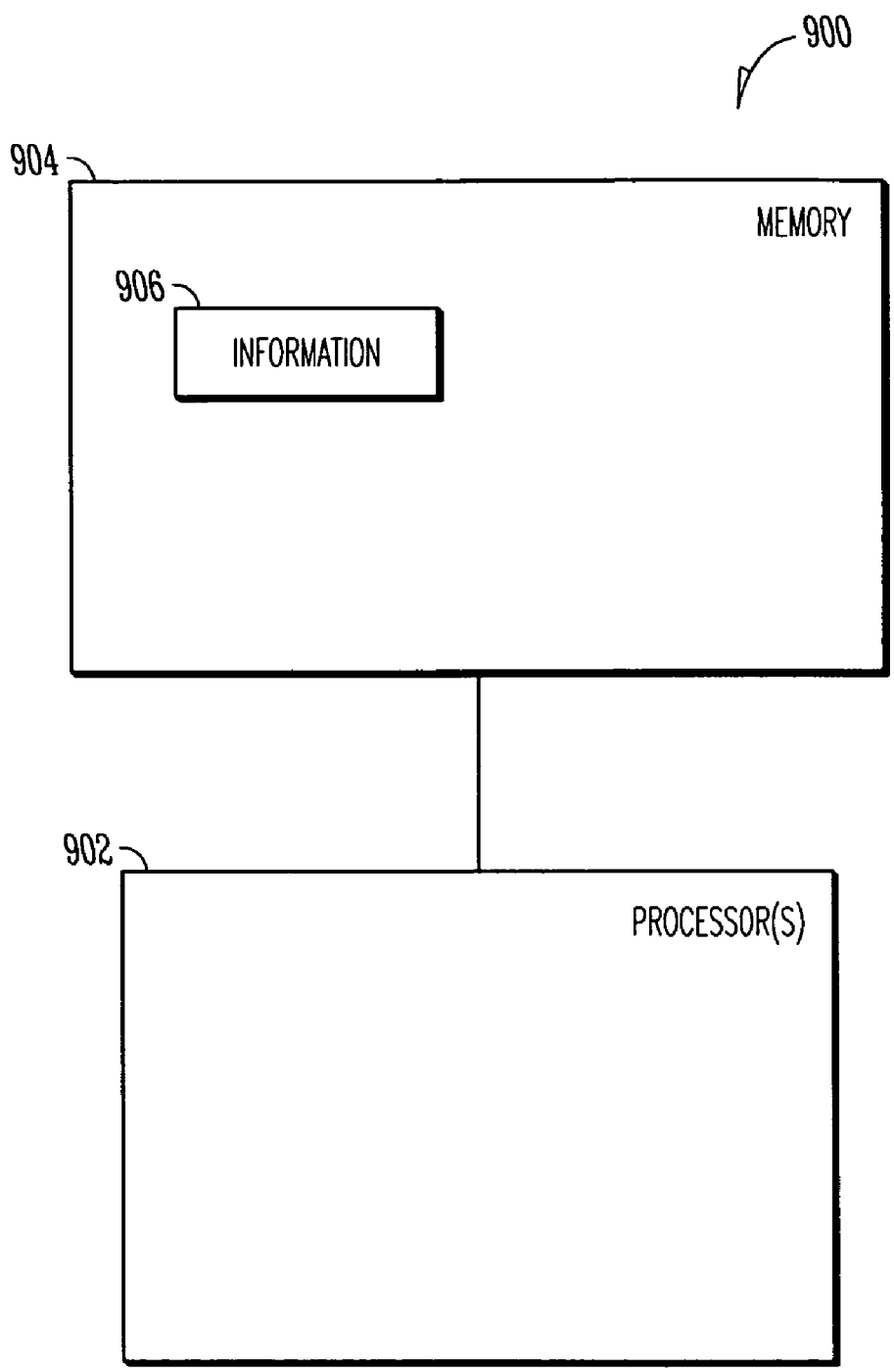
FIG. 9 is a block diagram of an article according to various embodiments.

FIG. 9 is a block diagram of an article 900 according to various embodiments. Such embodiments may comprise a computer, a memory system, a magnetic or optical disk, some other storage device, or any type of electronic device or system. The article 900 may include one or more processor(s) 902 coupled to a machine-accessible medium such as a memory 904 (e.g., a memory including electrical, optical, or electromagnetic elements). The medium may contain associated information 906 (e.g., computer program instructions, data, or both) which, when accessed, results in a machine (e.g., the processor(s) 906) performing the activities previously described herein.

Implementing the apparatus, systems, and methods disclosed herein provide real-time calculation of an individual's financial needs. The graphical representations of an individual's financial situation are automatically updated based on new data as it becomes available. If all of an individual's accounts are with the same financial product provider, then the graphical representation may be updated in real-time using information from the financial product provider's computerized systems. If the individual has some accounts that are with other financial product providers, the individual may provide that information so that the graphical representation provides a single view of the individual's financial condition. The apparatus, systems, and methods described herein may be used for all forms of financial planning.

This has been a detailed description of some exemplary embodiments of the invention(s) contained within the disclosed subject matter. Such invention(s) may be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and which shows by way of illustration, but not of limitation, some specific embodiments of the invention, including a preferred embodiment. These embodiments are described in sufficient detail to enable those of ordinary skill in the art to understand and implement the inventive subject matter. Other embodiments may be utilized and changes may be made without departing from the scope of the inventive subject matter.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

It is emphasized that the Abstract is provided to comply with 36 C.F.R. §1.62(b) requiring an Abstract that will allow the reader to quickly ascertain the nature and gist of the technical disclosure. It is submitted with the understanding that it will not be used to interpret or limit the scope or meaning of the claims.

What is claimed is:

1. A computerized method of facilitating financial counseling, the method comprising:
    obtaining financial data pertaining to an individual;
    obtaining business rules for analyzing the financial data, wherein at least two of the business rules each relate to a corresponding set of potential financial recommendations;
    generating, by analyzing the financial data using the business rules and using a processor of a computer, a financial assessment including two or more financial recommendations, wherein at least two of the financial recommendations include a value indicating priority for the individual and information on financial well-being of the individual;
    graphically representing, using the processor, the information on the financial well-being of the individual as a synopsis view graphical display on an electronic device;
    graphically indicating, using the processor, in the synopsis view graphical display one or more of the financial recommendations using a graphical component corresponding to at least one of the financial recommendations for the individual on the electronic device, wherein the synopsis view includes one or more highlighted components indicating that one or more of the financial recommendations represented by the component has been assigned a value indicating high priority and that the individual should act on the recommendations included in the highlighted sections;
    receiving an input towards acting on one of the recommendations included in one of the highlighted sections;
    generating, using the processor, an updated financial assessment based on the financial data, the business rules, and the received input towards acting on one of the recommendations included in one of the highlighted sections; and
    updating at least one of the recommendations indicated in the synopsis view graphical display in response to the updated financial assessment.

2. The computerized method of claim 1 wherein the one or more recommendations are indicated by changing an appearance of an item in the synopsis view graphical display.

3. The computerized method of claim 1 wherein the one or more recommendations are indicated by changing a position of an item in the synopsis view graphical display.

4. The computerized method of claim 1 wherein the one or more recommendations are indicated by animating an item in the synopsis view graphical display.

5. The computerized method of claim 1 wherein updating at least one of the recommendations is performed after a life event.

6. The computerized method of claim 1 wherein updating at least one of the recommendations is performed after a predefined period of time.

7. The computerized method of claim 1 wherein updating at least one of the recommendations is performed upon a change in data used for determining the financial well-being of the individual.

8. The computerized method of claim 1, wherein graphically indicating, using an electronic device, includes presenting the synopsis view graphical display free of numerical values of the individual's financial status.

9. A non-transitory machine-readable medium comprising instructions, which when executed by a computer, cause the computer to perform the following operations:
    obtaining financial data pertaining to an individual;
    obtaining business rules for analyzing the financial data, wherein at least two of the business rules each relate to a corresponding set of potential financial recommendations;
    generating, by analyzing the financial data using the business rules, a financial assessment including two or more financial recommendations, wherein at least two of the financial recommendations include a value indicating priority for the individual and information on financial well-being of the individual;
    graphically representing the information on the financial well-being of the individual as a synopsis view graphical display;
    graphically indicating in the synopsis view graphical display one or more of the financial recommendations using a graphical component corresponding to at least one of the financial recommendations for the individual, wherein the synopsis view includes one or more highlighted components indicating that one or more of the financial recommendations represented by the component has been assigned a value indicating high priority and that the individual should act on the recommendations included in the highlighted sections;
    receiving an input towards acting on one of the recommendations included in one of the highlighted sections;
    generating an updated financial assessment based on the financial data, the business rules, and the received input towards acting on one of the recommendations included in one of the highlighted sections; and updating at least one of the recommendations indicated in the synopsis view graphical display in response to the updated financial assessment.

10. The machine-readable medium of claim 9 wherein the one or more recommendations are indicated by changing an appearance of an item in the synopsis view graphical display.

11. The machine-readable medium of claim 9 wherein the one or more recommendations are indicated by changing a position of an item in the synopsis view graphical display.

12. The machine-readable medium of claim 9 wherein the one or more recommendations are indicated by animating an item in the synopsis view graphical display.

13. The machine-readable medium of claim 9 wherein updating at least one of the recommendations is performed after a life event.

14. The machine-readable medium of claim 9 wherein updating at least one of the recommendations is performed after a predefined period of time.

15. The machine-readable medium of claim 9 wherein updating at least one of the recommendations is performed upon a change in data used for determining the financial well-being of the individual.

16. A computerized system for facilitating financial counseling, the system having subsystems comprising:
  a processor; and
  a memory disposed in communication with the processor and storing processor-executable instructions, the instructions comprising instructions for:
    obtaining financial data pertaining to an individual;
    obtaining business rules for analyzing the financial data, wherein at least two of the business rules each relate to a corresponding set of potential financial recommendations;
    generating, by analyzing the financial data using the business rules, a financial assessment including two or more financial recommendations, wherein at least two of the financial recommendations include a value indicating priority for the individual and information on financial well-being of the individual;
    graphically representing the information on the financial well-being of the individual as a synopsis view graphical display,
    graphically indicating in the synopsis view graphical display one or more of the financial recommendations using a graphical component corresponding to at least one of the financial recommendations for the individual, wherein the synopsis view includes one or more highlighted components indicating that one or more of the financial recommendations represented by the component had been assigned a value indicating high priority and that the individual should act on the recommendations included in the highlighted sections,
    receiving an input towards acting on one of the recommendations included in one of the highlighted sections;
    generating an updated financial assessment based on the financial data, the business rules, and the received input towards acting on one of the recommendations included in one of the highlighted sections; and
    updating at least one of the recommendations indicated in the synopsis view graphical display in response to the updated financial assessment.

17. The computerized system of claim 16 wherein the one or more recommendations are indicated by changing an appearance of an item in the synopsis view graphical display.

18. The computerized system of claim 16 wherein the one or more recommendations are indicated by changing a position of an item in the synopsis view graphical display.

19. The computerized system of claim 16 wherein the one or more recommendations are indicated by animating an item in the synopsis view graphical display.

20. The computerized system of claim 16 wherein updating at least one of the recommendations is performed after a life event.

21. The computerized system of claim 16 wherein updating at least one of the recommendations is performed after a predefined period of time.

22. The computerized system of claim 16 wherein updating at least one of the recommendations is performed upon a change in data used for determining the financial well-being of the individual.

* * * * *